United States Patent [19]

Phillips et al.

[11] Patent Number: 5,008,740

[45] Date of Patent: Apr. 16, 1991

[54] APPARATUS AND METHOD FOR CREATING DIGITALLY REMODULATED VIDEO FROM DIGITLS COMPONENTS

[75] Inventors: Larry G. Phillips; Edwin R. Meyer; David C. Greene, all of Knoxville, Tenn.

[73] Assignee: North American Philips Corp., New York, N.Y.

[21] Appl. No.: 339,044

[22] Filed: Apr. 14, 1989

[51] Int. Cl.$^5$ ............................................. H04N 9/65
[52] U.S. Cl. ......................................... 358/23; 358/22
[58] Field of Search ............................... 358/13, 23, 22

[56] References Cited

U.S. PATENT DOCUMENTS

| | | | |
|---|---|---|---|
| 4,063,280 | 12/1977 | Hattori et al. | 358/22 |
| 4,352,122 | 9/1982 | Reitmeier et al. | 358/13 |
| 4,533,936 | 8/1985 | Tiemann et al. | 358/12 |
| 4,712,130 | 12/1987 | Casey | 358/22 |
| 4,782,391 | 11/1988 | McNeely et al. | 358/22 |

FOREIGN PATENT DOCUMENTS

| | | | |
|---|---|---|---|
| 145376 | 6/1989 | European Pat. Off. | |
| 3328025 | 2/1985 | Fed. Rep. of Germany | 358/23 |
| 1390 | 1/1983 | Japan | 358/23 |
| 24286 | 2/1983 | Japan | 358/13 |
| 137382 | 8/1983 | Japan | 358/13 |
| 189756 | 10/1984 | Japan | 358/13 |
| 197088 | 10/1985 | Japan | 358/13 |
| 81-03098 | 10/1981 | World Int. Prop. O. | |

*Primary Examiner*—John W. Shepperd
*Attorney, Agent, or Firm*—Algy Tamoshunas

[57] ABSTRACT

Apparatus and methods for remodulating digital luminance and color difference components for display as PIP information, or together with other composite video components for multi-PIP and test pattern applications are disclosed. A digital encoder is used for conducting a digital quadrature modulation on the color difference components and for digitally adding the luminance signal thereto prior to the converting of the remodulated information into an analog format. Preferably, the digital video information output by the encoder is in the form Y1+(R−Y)1, Y1 +(B−Y)1, Y2−(R−Y)1, Y2−(B−Y)1, Y3+(R−Y)2. Y3+(-b−Y)2, Y4 −(R−Y)2, . . . , where Y is the luminance component, R−Y and B−Y are color difference components, and where the numbers index received samples of the video components with the luminance component being sampled at twice the frequency of the color difference components. Where digitally modulated composite video is desired, fixed black level, burst, and background values are multiplexed with the active R−Y and B−Y signals, while fixed sync tip, black level, and background values are multiplexed with the active Y signals prior to encoding.

18 Claims, 3 Drawing Sheets

APPARATUS AND METHOD FOR CREATING DIGITALLY REMODULATED VIDEO FROM DIGITLS COMPONENTS

BACKGROUND OF THE INVENTION

The invention relates generally to apparatus and methods for remodulating video signals. More particularly, the invention relates to apparatus and methods for encoding digital video components such as luminance (Y) and color difference (R−Y, B−Y), the apparatus and methods beings useful in conjunction with picture-in-picture (PIP) video technology.

PIP systems which utilize digital video component encoders are well known in the art. Details of one such system are given in Masuda, Michio et al., "Picture in Picture System With a Digital Memory for VCRS", *IEEE Transactions on Consumer Electronics*, Vol, CE-33 No. 3; (Aug. 1987, pp. 230-238). As disclosed therein, the digital video components Y, R−Y, and B−Y are multiplexed, A/D converted, and then stored in memory for use at the appropriate time for a PIP display. When read from the memory, the R−Y and B−Y components are encoded by a digital quadrature modulation circuit and are then converted into analog form by a D/A converter. The Y component, which is not subjected to digital quadrature modulation, is likewise transformed into an analog signal by a separate D/A converter. The analog signals are then added by an analog adder prior to being sent to the television for output as PIP information on a video display.

While the PIP system provided by Masuda et al. is advantageous in many respects, it should be appreciated that it is desirable in a commercial environment to efficiently utilize circuitry so as to reduce costs. Also, it will be appreciated that the PIP system of Masuda et al. does not provide for the remodulation of composite video data, but rather only remodulates the luminance and color difference components.

SUMMARY OF THE INVENTION

It is therefore an object of the invention to provide an apparatus and method for remodulating video from luminance and color difference components which is effective and efficient.

It is a further object of the invention to provide an apparatus and method for remodulating video data in an efficient manner such that composite video data may be effectively remodulated.

In accord with the objects of the invention, an apparatus for remodulating digital luminance and color difference components for display as PIP information is provided and comprises a digital encoder for conducting a digital quadrature modulation on the color difference components and for digitally adding the luminance signal thereto prior to the converting of the remodulated information into an analog format. Preferably, the digital video information output by the encoder is in the form Y1+(R−Y)1, Y1+(B−Y)1, Y2−(R−Y)1, Y2−(B−Y)1, Y3+(R−Y)2, Y3+(B−Y)2, Y4−(−R−Y)2, . . . , where Y is the luminance component, R−Y and B−Y are color difference components, and where the numbers index received samples of the video components, with the luminance component being sampled at twice the frequency of the color difference components.

The color difference components stored in memory or preprocessed in the encoder prior to quadrature modulation are in a two's complement form, while the binary luminance component is centered in a range to allow for addition and subtraction of color difference without overflow. The encoder uses synchronous FSC and 2FSC signals, divided down from a 4FSC signal generated in a phase locked loop circuit, for controlling a multiplexer, XOR gate, and an adder. The color difference components are alternately selected by the multiplexer according to the polarity of a 2FSC clock. The color difference component is then multiplied by a factor K (if desired) to set the desired luminance/chrominance ratio. Each bit from the K multiplier is exclusively OR'ed with the FSC clock so as to invert the bits when FSC is high and to permit the bits to be unchanged when FSC is low. A negative of the color difference component is then produced from the inverted bits by using the FSC clock as a carry-in to an adder which adds the FSC clock to the inverted bits. The adder also adds the luminance component Y to whichever color difference component (i.e. R−Y, B−Y, −(R−Y), −(B−Y)) is being received at the particular time.

A better understanding of the invention, as well as additional advantages and objects of the invention will become apparent to the those skilled in the art upon reference to the detailed description and the accompanying drawings.

DETAILED DESCRIPTION OF THE PREFERRED EMBODIMENT

Figure 1:
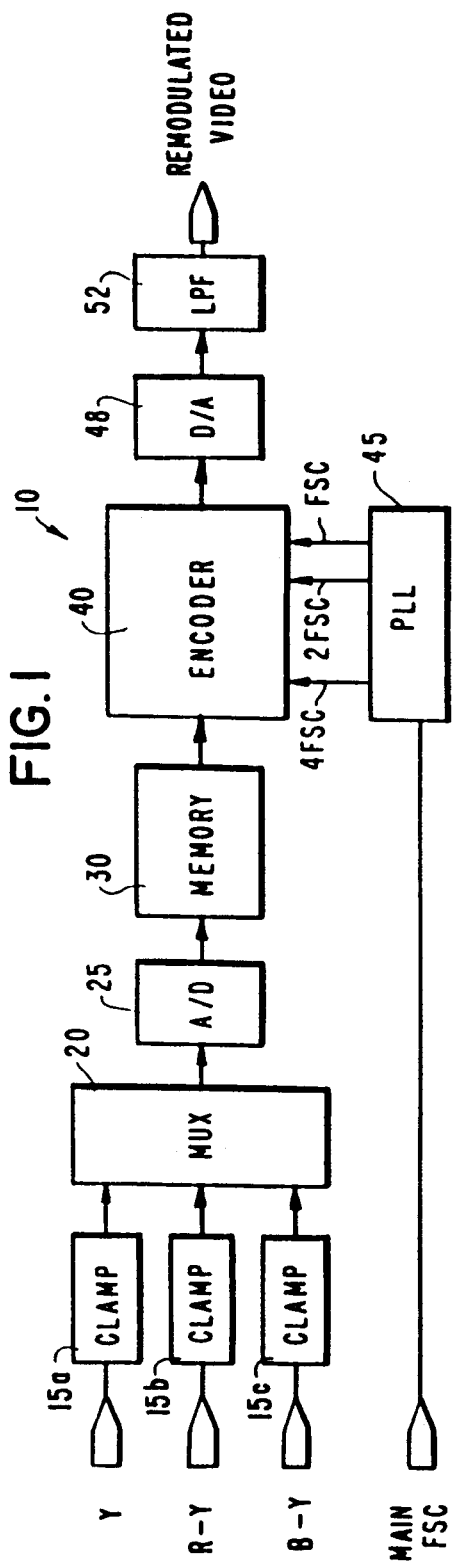
FIG. 1 is a block diagram of a PIP system incorporating the invention.

The block diagram of FIG. 1 shows a simplified PIP system 10 employing a digital encoder 40. As indicated, the PIP video components, Y, R−Y, and B−Y, are clamped via clamps 15a, 15b, and 15c. The luminance component Y is clamped to the zero IRE backporch value which is equal to the lowest value of the range of A/D converter 25. The color difference components R−Y and B−Y are clamped to the midpoint of the A/D reference range. The component values are then multiplexed by multiplexer 20, converted into offset binary digital signals by A/D converter 25, and stored in memory 30 until required for display. Of course, prior to storage in memory, the signals may be processed such as by a controller and/or vertical filter (not shown) such that only desired information need be stored in memory 30. When required for display, the digital signals are sent to encoder 40 which is locked to the main channel color burst by use of a phase-locked-loop (PLL) 45. The encoder conducts a digital quadrature modulation on the color difference video components (as will be described in more detail with reference to FIG. 2), and digitally adds the luminance signal thereto. The resulting digital (re)modulated signals are then converted into analog form by D/A converter 48, prior to being low pass filtered by filter 52 and sent to a television (not shown).

Either prior to being stored, or prior to encoding via a digital quadrature modulation by the encoder 40, the offset binary color difference components are preferably converted into a two's complement form. The conversion from offset binary into a two's complement is accomplished through removing the offset. As will be described hereinafter, in the preferred embodiment, such a conversion is simply accomplished by inverting the msb of the component. Also, prior to adding the luminance signal to the quadrature modulated color difference signals, the luminance signal is preferably expanded by one bit and centered within the new range so as to allow for addition and subtraction of the color difference signals without overflow. Where the original luminance component is a six bit signal, the expansion and recentering is accomplished by adding the value thirty-two (i.e. "100000") to the luminance component. In circuitry this is done by inverting the msb of the six bit signal, and by using the original msb as the new msb.

Figure 2:
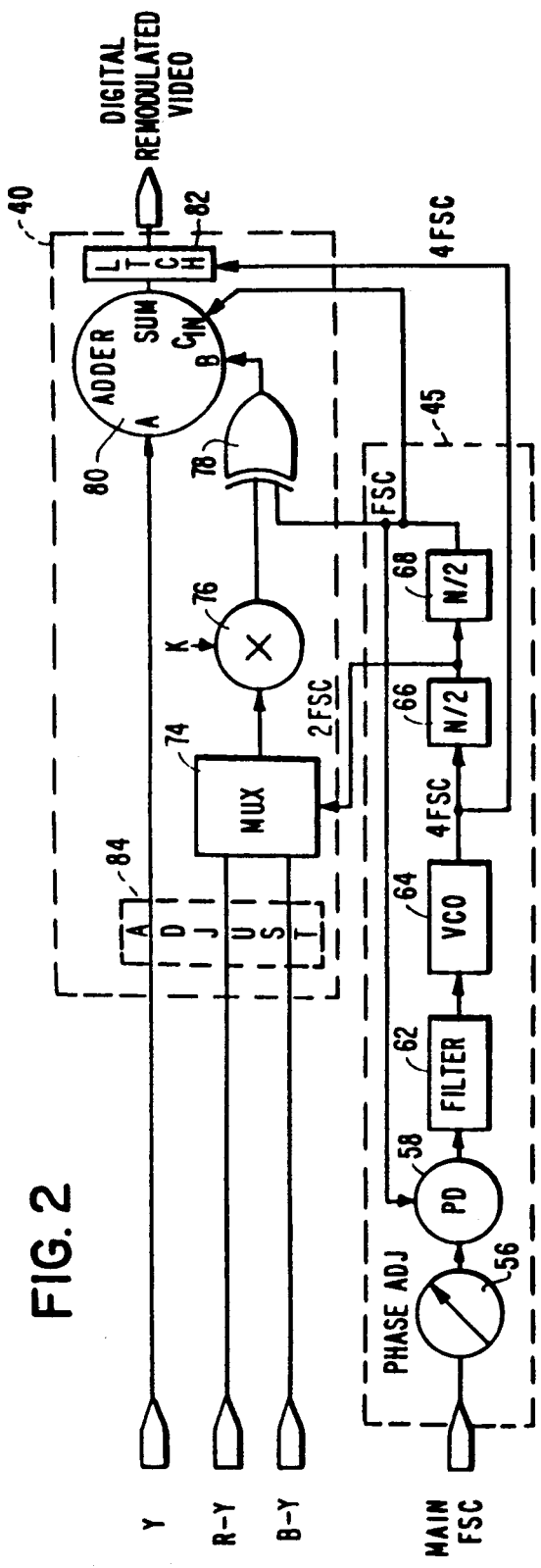
FIG. 2 is a block diagram of the encoder and phase locked loop circuitry for conducting the digital quadrature modulation on the luminance and color difference components in accord with the invention.
Figure 3:
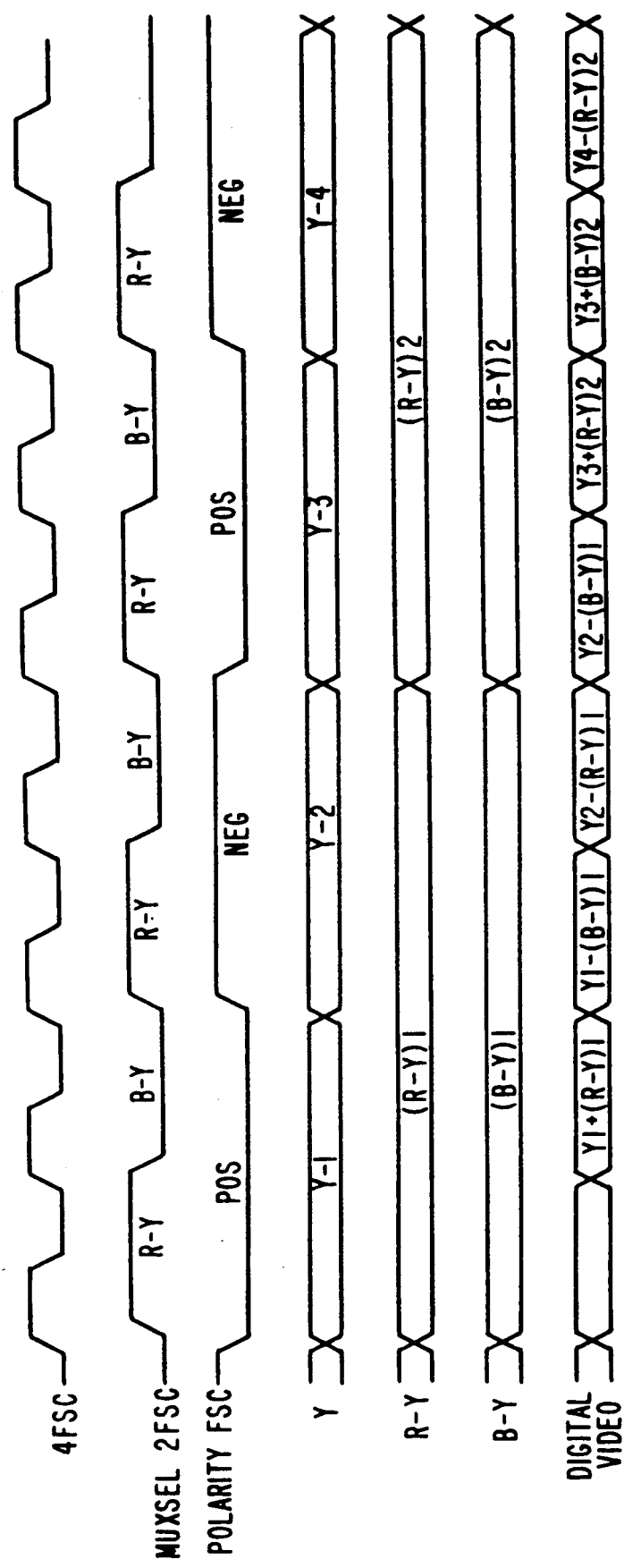
FIG. 3 is a timing diagram of the encoder of the invention.

Details of the PLL 45 and the encoder 40 are seen in FIG. 2 which may further be understood with reference to FIG. 3. The PLL 45 is basically a standard PLL which locks to a main subcarrier signal MAIN FSC. A phase adjustment means 56 is used to set the phase and null out any delay between the addition carried out by an adder 80 in the encoder, and the generation of FSC in the decoder on the main chassis (not shown). The output of the phase adjustment means 56 is sent to the phase detector 58, whose error signal output in turn is filtered by filter 62 and sent to voltage controlled oscillator 64. Voltage controlled oscillator 64 has a nominal oscillation of 4FSC and outputs a clock having a phase determined by the phase adjustment means 56. The 4FSC clock is divided down by divide-down blocks 66 and 68 to produce a 2FSC and an FSC clock. The 2FSC clock is used to control a multiplexer 74 of the encoder 40 while the FSC clock is sent as an input to an XOR gate 78 and to the carry-in input of the adder 80 of encoder 40. The FSC clock is also fed back to the phase detector 58 so that the phase detector 58 can output a voltage error signal which can be used to change the oscillation frequency of the voltage controlled oscillator 64.

The digital quadrature modulation encoder 40 is preferably comprised of multiplexer 74, multiplier means 76, XOR gate means 78, adder means 80, and latch 82, although an adjustment means 84 for generating a two's complement signal from the incoming color difference signal, and for expanding and recentering the luminance component may be included in the encoder if desired. The inputs to the multiplexer are the two's complement R−Y and B−Y color difference signals received via adjustment means 84 via memory 30. Every 2FSC clock cycle (high and low polarity), one R−Y and one B−Y color difference signal are passed by the multiplexer 74, each during a time period of ¼FSC. Regardless of which signal is being passed by the multiplexer at a given time, the signal is preferably multiplied in multiplier means 76 by some constant K which is preferably of a value 1.5, although other values could be used. The constant K is used to adjust the values of the color difference components relative to the luminance component Y according to techniques well known in the art. The adjusted color difference component which is now a seven bit signal is then fed as one input to XOR gate means 78 (typically comprising a plurality of XOR gates; one for each bit of the color difference signal), with the FSC clock being sent as the other input. As a result, when clock FSC is low for a period of ¼FSC, the color difference signal bits being fed to the XOR gate means 78 pass through unchanged, while when the clock FSC is high, each bit of the color difference signal is inverted by the XOR gate means 78. However, because the color difference signal was in two's complement form, when the value one is added to the inverted bits, the negative of the original two's complement value is provided. Thus, the FSC signal is provided as a carry-in input of adder 80, such that when FSC is high, the inverted bits plus the carry-in will cause the negative of the color difference signal to be obtained, and when FSC is low, an intact color difference signal is obtained. As a result, the sum of the adjusted color signal received by the adder 80 at its "B" input and the FSC clock signal received at the carry-in at the "CIN" input is the repeating quadrature modulated sequence of R−Y, B−Y, −(R−Y), −(B−Y) . . . , each lasting a clock period of ¼FSC as seen in FIG. 3. This sequence provides the necessary information for the D/A converter 48 to provide the chrominance signals used in the television display.

Adder 80 also has the luminance component Y as an input such that the expanded and adjusted seven bit luminance component Y is added digitally to the seven bit two's complement quadrature modulated color difference signals. Because the binary luminance signal is sufficiently large relative to the most negative quadrature modulated two's complement color difference signal, the signal output by the adder is always a binary (i.e. positive two's complement) value. Because, in the preferred embodiment, the luminance component Y changes at twice the frequency of the color difference components (i.e. a 2:1:1 ratio), when the luminance component is added to the repeating sequence by adder 80, the resulting remodulated sequence is: Y1+(-R−Y)1, Y1+(B−Y)1, Y2−(R−Y)1, Y2−(B−Y)1, Y3+(R−Y)2, Y3+(B−Y)2, Y4−(R−Y)2, Y4−(-B−Y)2, . . . where the numbers reference a sample of the component. As the digital sequence is formulated, the eight bit results are temporarily stored in latch 82. The digital sequence is then clocked out of latch 82 according to the synchronous 4FSC clock. As shown in FIG. 1, the digital remodulated video signal leaving encoder 40 is converted into an analog signal by D/A converter 48 (to provide a luminance plus chrominance signal) and filtered by low pass filter 52 to provide a remodulated analog video signal.

Figure 4:
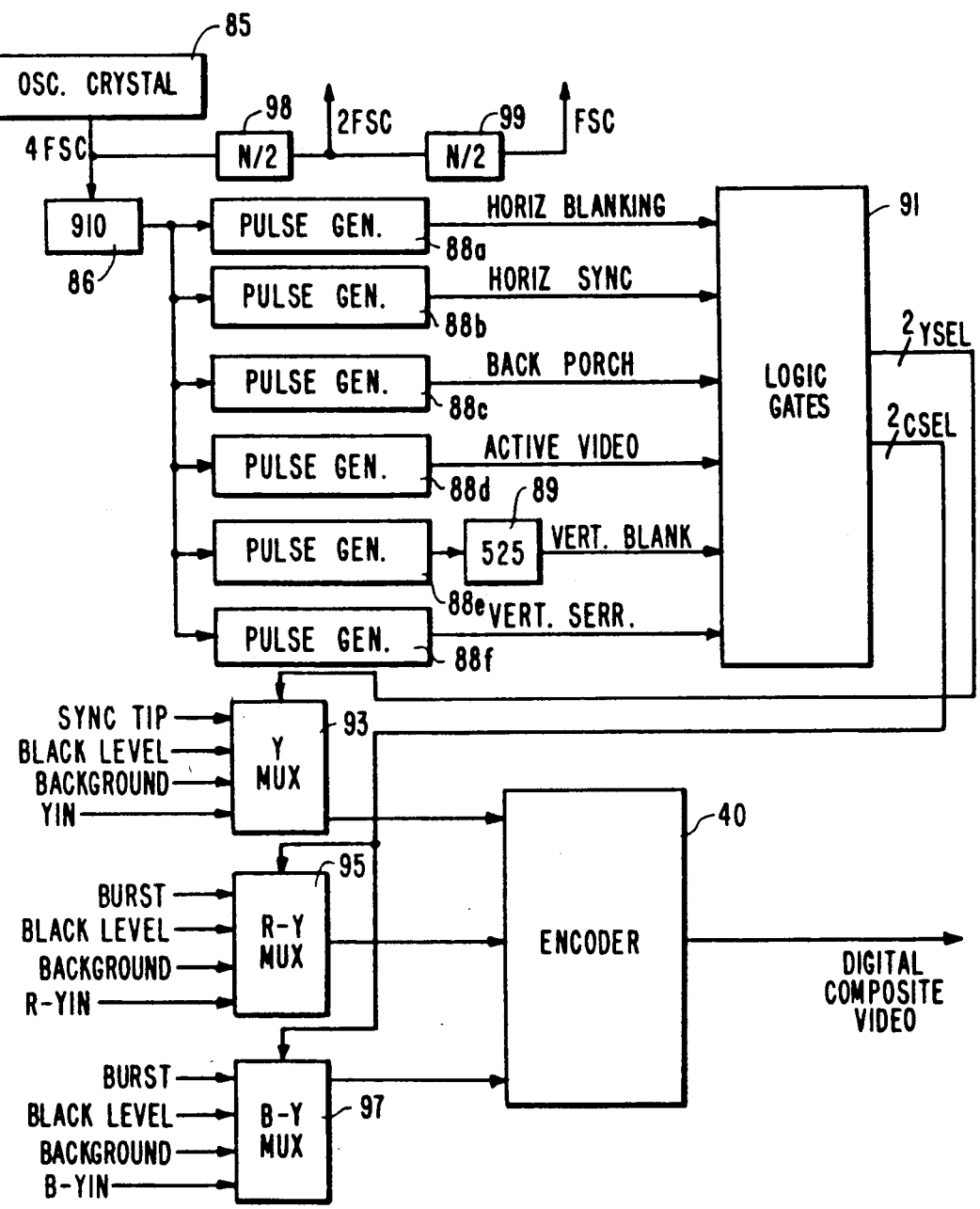
FIG. 4 is a block diagram of the front end of a system for creating digitally modulated composite video.

It should be appreciated by those skilled in the art that a digitally modulated composite video system could be generated using the provided teachings and extending the system to include sync, color burst, and other composite video information. In particular, and as shown in FIG. 4, a 4FSC clock is provided. The 4FSC clock may be generated locally if desired by a oscillating crystal 85. The clock cycles are counted and effectively divided down by nine hundred and ten counter 86. A plurality of start and stop count decoders 88a-88f are used to provide pulses which indicate over what periods of the nine hundred and ten clock cycle the horizontal blanking, the horizontal sync, the back porch (burst), the active video, the vertical blanking, and the vertical serration pulses extend. As indicated in FIG. 4, in order to provide a pulse indicative of the vertical blanking, a five hundred and twenty-five counter 89 is utilized. The pulses output by the decoders 88 are then sent to logic gate section 91 which preferably generates a two-bit select signal for Y multiplexer 93, and R−Y and B−Y multiplexers 95 and 97. The inputs to Y multiplexer 93 as indicated are the received Y video signal (Yin) which typically varies over time and which represents the active video signal coresponding to the active video display, and the sync tip, black level, and background values which are preferably fixed values and which are easily generated by hard-wiring or according to other techniques known in the art. Likewise, the inputs to R−Y an B−Y multiplexers 95 and 97 are indicated as the received active R−Y video signal (R−Yin) or the received active B−Y video signal (B−Yin) and the burst, black level, and background values which are fixed values and easily generated. Where the active video decoder 88d indicates that it is time for the active video to be encoded, the logic gate section 91 outputs a code for selecting the Yin signal at multiplexer 93, and the R−Yin and B−Yin signals at multiplexers 95 and 97 such that the received active Yin, R−Yin, and B−Yin signals are passed by multiplexers 93, 95, 97 and sent as the Y, R−Y, and B−Y inputs to the encoder 40 as seen in FIG. 2. Otherwise, other values may be chosen by the multiplexers 93, 95, 97 depending upon which of decoders 88 are active.

The digitally modulated composite video system has application in at least the test signal and multiple picture-in-picture (MPIP) areas. In test signal applications, much of the circuitry of FIGS. 1 and 2 can be eliminated, as the clamps 15, the multiplexer 20, the A/D converter 25 and the phase locked loop 45 are dispensible. The composite video signal is preferably stored as two's complement digital information in a non-volatile memory such as a ROM which would constitute memory 30 for such an application, while the 2FSC and FSC signals required for multiplexer 74 and exclusive OR gate means 78 would be generated by divide down blocks 98 and 99.

In MPIP applications where a full screen is to be comprised of picture-in-picture segments (i.e. the main signal is not used), but where the possibility of a standard PIP application is still desired, the circuitry of FIGS. 1 and 2 would be utilized. The oscillator 85 and divide-down blocks 98 and 99 shown in FIG. 4 would not be necessary, as they are duplicative of circuitry of the PLL 45. The 4FSC clock input into the nine hundred and ten counter 86 would be taken from the output of voltage controlled oscillator 64. Multiplexers 93, 95, and 97 of FIG. 4 would be inserted between memory 30 and encoder 40 of FIG. 1, such that the Yin, R−Yin, and B−Yin signals would be obtained from memory 30. In this manner the inputs into encoder 40, which could be taken from different portions correlating to different PIP inputs, or from different memories, would permit encoder 40 to provide a digital remodulated composite video signal comprised of smaller pictures superimposed on a background of fixed color.

There has been described and illustrated herein an apparatus for creating a remodulated video and/or a remodulated composite video signal from digital components. It will be appreciated that the methods for creating remodulated or composite video from digital components are strongly tied to the apparatus and are taught from the flow path of component data in the described block diagrams. While particular circuitry has been described for accomplishing the objects of the invention, it is not intended that the invention be limited thereby as it is intended that the invention be as broad in scope as the art will allow and that the specifications be read likewise. Thus, while the invention was described as using components which are digitized into six bits, the component range could be digitized into fewer or more bits as desired. For example, where a remodulated composite video signal is created, a larger range might be desirable to accommodate the low level of the horizontal sync and burst signals, and hence additional bits (and/or additional shifting) might be used. Also, while the color difference component was converted into two's complement code prior to quadrature modulation, it will be appreciated that other means and methods for creating the R−Y, B−Y, −(R−Y), −(B−Y) sequence could be used. For example, a signed magnitude signal could be provide by the A/D converter, and the −(R−Y) and −(B−Y) signals could be provided by inverting the sign. Of course, a compatible adder and D/A converter would have to be utilized to further process such signals. Further, while a particular value was given for the multiplication constant K, it will be appreciated that K can be varied over a range of values over time as desired.

It will also be appreciated that while the invention was disclosed as comprising various blocks, many of the blocks may be integrated into a single circuit or divided into its own component blocks as desired. For example, while the encoder of the invention was described as including various blocks including an "adjustment" block, the two's complement conversion as well as the expansion and recentering accomplished by the "adjustment" block could be accomplished in a separate block any time after A/D conversion, or in an analog manner prior to A/D conversion. Therefore, it will be apparent to those skilled in the art that other changes and modifications may be made to the invention as described in the specification without departing from the spirit and scope of the invention as so claimed.

What is claimed is:

1. An encoder for remodulating digital video luminance (Y) and color difference components (R−Y, B−Y), comprising:
   (a) converting means for converting said digital color difference components into two's complement format;
   (b) means for conducting a digital quadrature modulation on said digital color difference to effectively provide quadrature modulated signals R−Y, B−Y, −(R−Y), and −(B−Y) in a desired repeating sequence;
   (c) addition means for digitally adding said luminance signal to said digital quadrature modulated signals, the sum of said luminance and quadrature modulated color difference color difference signals providing a digital remodulated video signal suitable for conversion into an analog remodulated video signal; and
   (d) said means for conducting a digital quadrature modulation comprising a first clock signal having high and low polarities, an exclusive OR gate means coupled to said two's complement format color difference components and to said first clock signal for passing said two's complement color difference component when said first clock signal is of low polarity, and for inverting the bits of said two's complement color difference component when said first color signal is of high polarity, and said means for conducting a digital quadrature modulation further comprising an adding means coupled to an output of said exclusive OR gate means and to said first clock signal for adding said first clock signal to the output of said exclusive OR gate means.

2. An encoder according to claim 1 further comprising:
multiplexer means having said R−Y and B−Y signals as inputs and an output coupled to said exclusive OR gate means, said multiplexer means for multiplexing said R−Y and B−Y signals according to the polarity of a second clock signal having twice the frequency of said first clock signal, wherein said quadrature modulated color difference signals R−Y, B−Y, −(R−Y), and −(B−Y) in a desired repeating pattern are thereby effectively generated over a single first clock cycle.

3. An encoder according to claim 2, wherein:
said adding means is further for adding said digital luminance signal to said effectively generated quadrature modulated color difference signals.

4. An encoder according to claim 3, further comprising:
(e) multiplication means coupled to said multiplexer means and said exclusive OR gate means for multiplying said multiplexed R−Y and B−Y two's complement signals by a constant K and providing the results to said exclusive OR gate means.

5. An encoder according to claim 2 in combination with a phase locked loop circuit, said phase locked loop circuit comprising means for receiving a subcarrier clock signal and means using said subcarrier clock signal for generating said first and second clock signals.

6. The combination of claim 5 further comprising an analog/digital converter means for digitizing analog Y, R−Y, and B−Y component signals, a memory means for storing said digitized component signals and for supplying said digitized component signals to said encoder, digital/analog converter means for receiving said sum of said luminance and quadrature modulated color difference signals and for providing analog remodulated video signals therefrom suitable for input into a video input of a television.

7. An encoder according to claim 4 in combination with a phase locked loop circuit, said phase locked loop circuit comprising means for receiving a subcarrier clock signal and means using said subcarrier clock signal for generating said first and second clock signals.

8. The combination of claim 7 further comprising an analog/digital converter means for digitizing analog Y, R−Y, and B−Y component signals, a memory means for storing said digitized component signals and for supplying said digitized component signals to said encoder, digital/analog converter means for receiving said sum of said luminance and quadrature modulated color difference signals and for providing analog remodulated video signals therefrom suitable for input into a video input of a television.

9. An encoder according to claim 2 in combination with a phase locked loop circuit, said phase locked loop circuit comprising phase adjustment means for receiving a subcarrier clock signal and outputting a phase adjusted signal in response thereto, a phase detector means having said phase adjustment means and a circuit feedback input as inputs for providing an error signal, a controlled oscillator means coupled to said phase detector means having a nominal oscillation frequency equal to a multiple of the frequency of said subcarrier clock signal wherein said error signal from said phase detector adjusts the frequency of said controlled oscillator means to provide said second clock signal or a multiple thereof which can be divided down to said second clock signal, and a first divide down means for dividing said second clock signal by two to provide said first clock signal, wherein said first clock signal is fed back to said feedback input of said phase detector means.

10. An apparatus for remodulating composite luminance and color difference components, where during a video cycle each composite color difference and luminance component is comprised of at least one fixed value signal and at least one active video signal, the active video signal corresponding to an active video display, said apparatus comprising:
(a) means for obtaining a clock signal having a frequency related to a subcarrier frequency, wherein a predetermined number of cycles of said clock signal comprises said video cycle;
(b) counting means for counting the clock signal cycles;
(c) means for generating said fixed value signals;
(d) source means for providing said active video signals, said source means comprises an analog/digital converter means for digitizing received analog luminance and color difference signals corresponding to said active video signals, a memory means for storing said digitized active video signals and for supplying said digitized active video signals to said encoder;
(e) multiplexer means coupled to said means for generating said fixed values, said source means, and said counting means, for passing either said fixed value signals or said active video signals according to the count of said counting means, the output of said multiplexer means comprising digital composite luminance and digital composite color difference components;
(f) encoder means coupled to said multiplexer means including means for conducting a digital quadrature modulation on said digital composite color difference components to provide digital quadrature modulated signals R−Y, B−Y, −(R−Y), and −(B−Y) in a desired repeating sequence, where R−Y and B−Y are said digital composite color difference signals, and adding means for digitally adding said digital composite luminance component to said digital composite quadrature modulated signals, the sum of said digital composite luminance component and said digital composite quadrature modulated signals providing a digital remodulated composite video signal suitable for conversion into an analog remodulated composite video signal;
(g) converting means for converting at least said digital composite color difference signals into two's complement format; and
(h) second multiplexer means having said digital composite color difference signals (R−Y, B−Y) as inputs, wherein
said generated clock signal is at least a first clock signal having high and low polarities, and a second clock signal having high and low polarities at twice the frequency of said first clock signal,
said means for conducting a digital quadrature modulation comprises said first clock signal, an exclusive OR gate means coupled to the output of said second multiplexer means and to said first clock signal for passing two's complement composite color difference signals when said first clock signal is of low polarity, and for inverting the bits of said two's complement composite color difference signals when said first clock signal is of high polarity, said adding means being further coupled to an output of said exclusive OR gate means and to said first clock signal.

11. An apparatus according to claim 10, wherein:
said means for obtaining a clock signal comprises a crystal oscillator, and
said source means comprises a non-volatile memory means.

12. An apparatus according to claim 11, further comprising:
(g) digital to analog converter means coupled to an output of said encoder means for taking said sum and providing an analog chrominance plus luminance signal therefrom.

13. An apparatus according to claim 12, wherein:
said means for obtaining a clock signal comprises either a crystal oscillator circuit for generating signals having frequencies related to a subcarrier frequency, or a phase locked loop circuit having means for receiving a subcarrier clock signal of said subcarrier frequency and means using said subcarrier clock signal for generating signals having frequencies related to said subcarrier frequency.

14. An apparatus according to claim 13, further comprising:
(g) digital to analog converter means coupled to an output of said encoder means for taking said sum and providing an analog chrominance plus luminance signal therefrom.

15. A method for remodulating digital video luminance (Y) and color difference components (R−Y, B−Y), comprising:
obtaining analog luminance and color difference signals Y, R−Y, and B−Y;
digitizing said Y, R−Y, and B−Y signals;
converting said digitized R−Y and B−Y signals into two's complement format;
modulating said digital color difference components according to a digital quadrature modulation technique to effectively provide quadrature modulated color difference signals R−Y, B−Y, −(R−Y), and −(B−Y) in a desired repeating sequence; and
digitally adding samples of said luminance signal to said digital quadrature modulated signals, the sum of said luminance and quadrature modulated color difference signals providing a digital remodulated video signal suitable for conversion into an analog remodulated video signal.

16. A method according to claim 15, wherein:
said modulating step comprises,
multiplexing said digitized two's complement format R−Y and B−Y signals according to a clock signal having a first frequency,
inverting the bits of said two's complement format R−Y and B−Y signals when the polarity of a clock having a frequency twice that of said first frequency is of a first polarity, and permitting the bits of said two's complement format R−Y and B−Y signals to remain intact when the polarity of said clock having a frequency twice that of said first frequency is of a second polarity; and
adding a value of one to said inverted bits.

17. A method according to claim 15, further comprising:
after said digitally adding step,
converting said digital sum into an analog signal capable of input into a video input of a television.

18. A method for remodulating composite luminance and color difference components, where during a video cycle each composite color difference and luminance component is comprised of at least one fixed value two's complement signal and at least one active video two's complement signal, the active video signal corresponding to an active video display, said apparatus method comprising:
(a) obtaining a clock signal having a frequency related to a subcarrier frequency, wherein a predetermined number of cycles of said clock signal comprises said video cycle;
(b) counting the cycles of said clock signal;
(c) obtaining said fixed values signals and said active signals for said composite luminance and composite color difference components;
(d) multiplexing said fixed and active signals according to the clock signal count in said video cycle so as to obtain digital composite luminance and digital composite color difference components;
(e) encoding said digital composite color difference component to provide digital composite quadrature modulated signals R−Y, B−Y, −(R−Y), and −(B−Y), in a desired repeating sequence, where R−Y and B−Y are said composite color difference components, and
(f) digitally adding said composite luminance component to said composite digital quadrature modulated signals, the sum providing a digital remodulated composite video signal suitable for conversion into an analog remodulated composite video signal.

* * * * *